May 5, 1931. A. P. LEE 1,804,261

SEMIAUTOMATIC DUMPING BODY

Filed May 1, 1924 5 Sheets-Sheet 4

Witnesses:
W.P.Kilroy
Harry R.Lewitz

Inventor:
Albert P.Lee
By May W. Zabel
Atty.

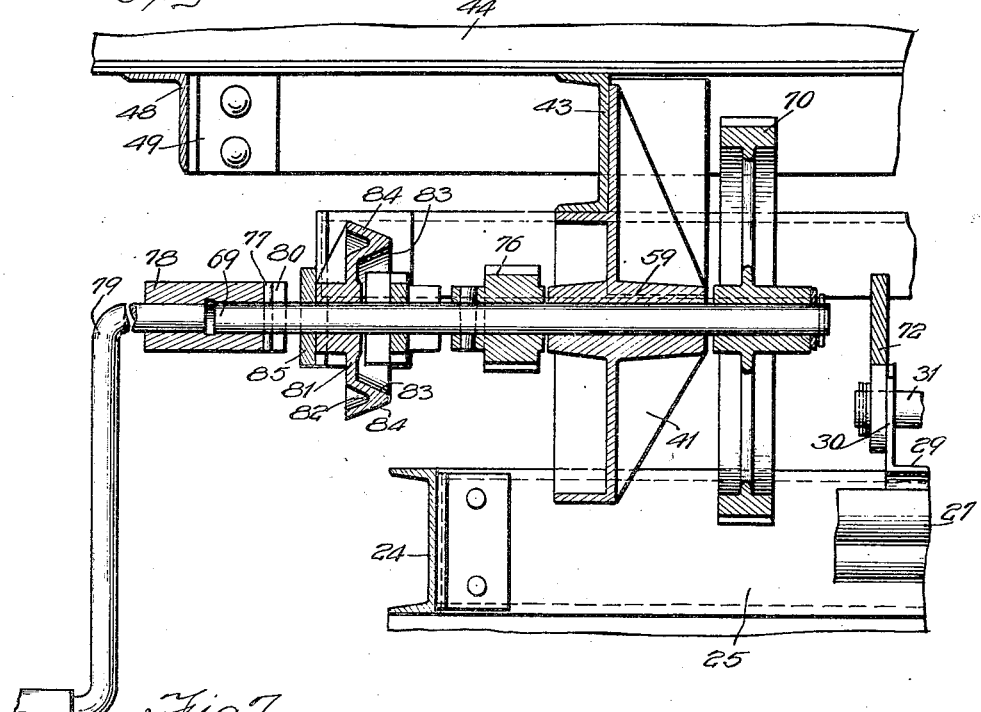
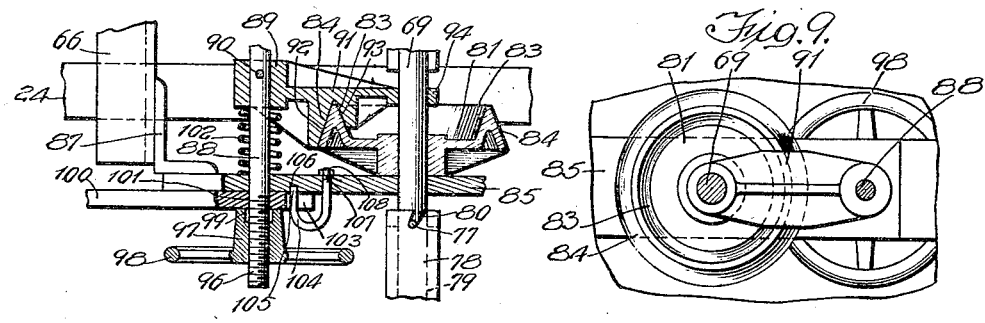
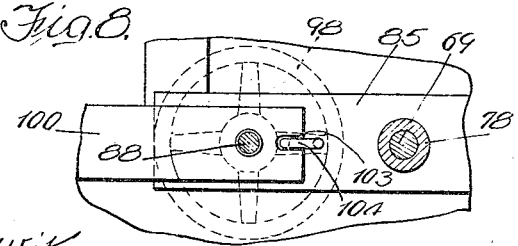
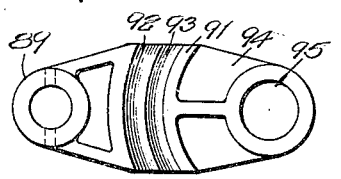

Patented May 5, 1931

1,804,261

UNITED STATES PATENT OFFICE

ALBERT P. LEE, OF CHICAGO, ILLINOIS, ASSIGNOR TO LEE TRAILER & BODY CO., OF CHICAGO, ILLINOIS, A CORPORATION OF ILLINOIS

SEMIAUTOMATIC DUMPING BODY

Application filed May 1, 1924. Serial No. 710,291.

My invention relates to vehicles and more particularly to a vehicle provided with a dumping body.

It is a purpose of my invention to provide a vehicle having a dumping body that is semi-automatic in operation, that is, that dumps partly due to the action of gravity and partly due to operation of certain mechanism by hand or in any other suitable manner, as by some form of power operated device.

More particularly it is a purpose of my invention to provide a vehicle with a dumping body that is pivotally mounted on the vehicle framework and to provide means for dumping said body, whereby said body is swung on its pivot by operating said means until the line upon which the center of gravity of the load is acting has passed beyond the pivot upon which the body is mounted, whereupon the body continues its dumping movement due to the action of gravity.

It is another purpose of the invention to provide means in a body of the above mentioned character whereby the dumping action of the body may be controlled at all times, if desired, and whereby the dumping action can be halted at any point desired so that the load may be dumped en masse or gradually discharged as desired.

It is still a further purpose of the invention to provide new and improved means for moving the body from normal load carrying position toward discharge position, comprising members pivotally mounted on the vehicle framework and pivotally engaging means movable with the body, said means being operable to move the pivotal axis of the connection therewith so as to vary the distance between said body and the pivotal axes of the members on the framework, whereby said body can be swung on its pivot.

More particularly it is a purpose of the invention to provide a dumping body mounted for swinging movement on a framework with links or arms pivotally mounted on fixed pivots on said framework, the other ends of said arms or links engaging means swingable about an axis that is fixed relative to the body to vary the distance between said axis and the pivots of the arms on the framework, whereby said body may be dumped or moved to load carrying position upon rotation of said means about said axis. Said means is preferably in the form of crank elements that rotate about suitable shaft-like members, said crank elements being preferably provided with gear teeth meshing with one of the gears of a train of gears which are actuated by a suitable member, such as a hand crank or other power device, to rotate said crank elements to move the dumping body toward dumping position or toward load carrying position.

Preferably, the operating mechanism is so constructed that after the body passes the position where the center of gravity of the load is acting beyond the pivot about which said body turns, the mechanism will be free to rotate to allow gravity dumping of the body without interference on the part of the handle or hand crank, so that the dumping is partly done by power means and partly by automatic means.

It is still a further purpose of the invention to provide means for halting the movement of the body at any desired point, said means being independently operable of the hand crank or handle mechanism. Thus, the body can be left in any desired angular position and by providing an end gate in the body that may be set to open to any desired degree, the body may be used for spreading or similar purposes as well as for dumping on a pile.

Other objects and advantages of the invention will appear as the description of the accompanying drawings proceeds. However, I desire to have it distinctly understood that I do not intend to limit myself to the exact details shown or described, but that I intend to include as part of my invention all such obvious changes and modifications of parts as would occur to a person skilled in this art and as would fall within the scope of the claims.

In the drawings:

Fig. 6 is an enlarged, fragmentary, sectional view taken on the line 6—6 of Fig. 2;

Fig. 7 is a fragmentary, sectional view of the brake mechanism for holding the body in any desired position;

Fig. 8 is a section taken on the line 8—8 of Fig. 2;

Fig. 9 is a fragmentary section taken on the line 9—9 of Fig. 2, showing the braking mechanism for holding the body stationary in any desired position; and Fig. 10 is a side elevation of the brake shoe or braking member of the braking mechanism shown in Figs. 7 and 9.

Figure 1:
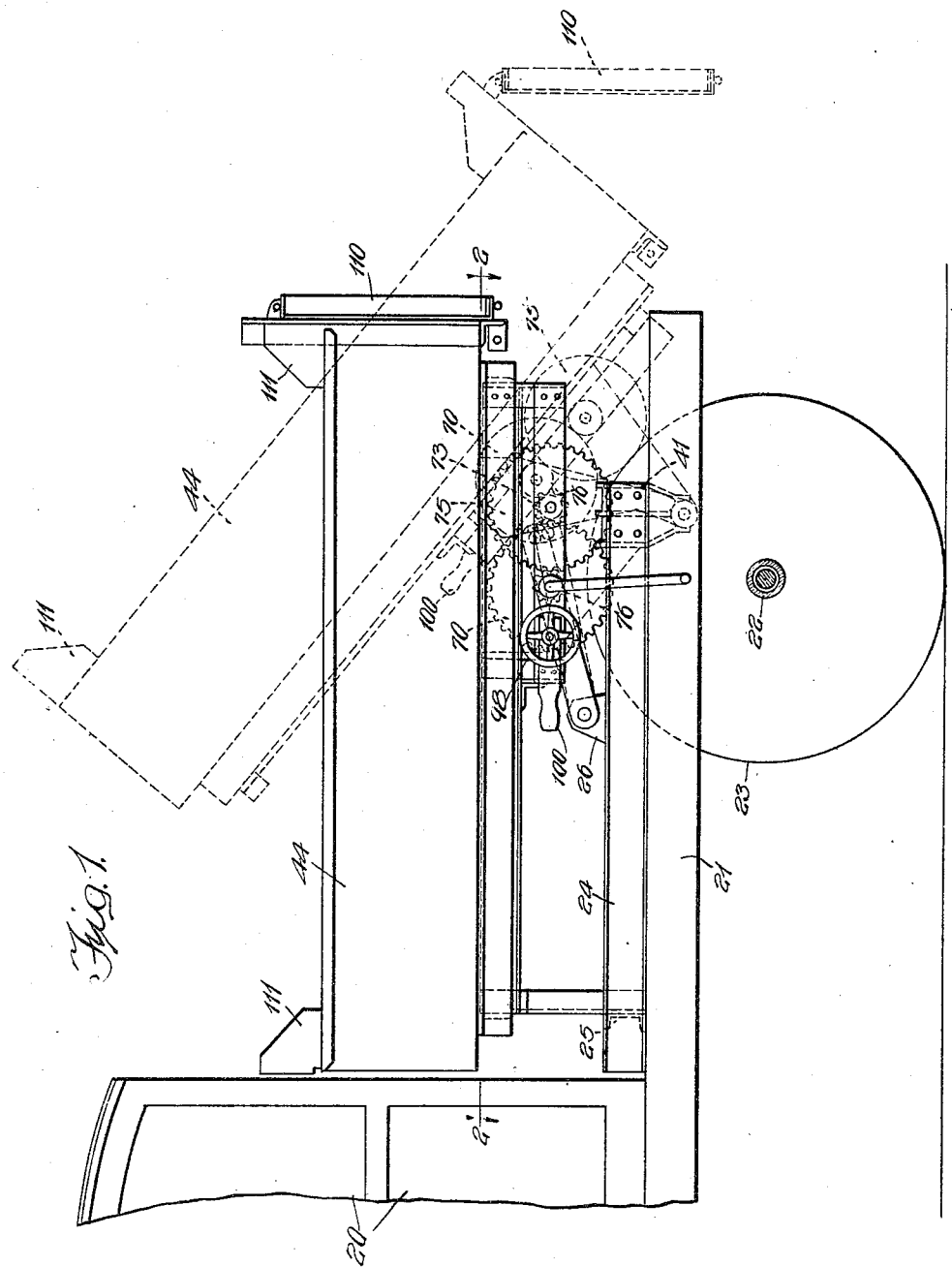
Fig. 1 is a view in side elevation of the rear portion of a vehicle, showing my improved dumping body applied thereto, the body being shown in full lines in load carrying position and in dotted lines in dumping position.

Referring in detail to the drawings, in Fig. 1 is shown a vehicle 20 having a framework comprising the longitudinally extending members 21. The front portion of the vehicle is broken away in Fig. 1. The rear axle 22 and the rear wheels 23 are merely shown diagrammatically to indicate the position thereof. Said longitudinally extending members 21 are shown as being in the form of channels and have the channels 24 mounted thereon, as will be clear from Figs. 3 and 4. The channels 24 are the longitudinally extending members of a framework comprising the cross member 25 which is also shown as being in the form of a channel. Said longitudinally extending members 24 are provided with a pair of brackets 26 which are shown as being substantially angular in cross section, said members 26 extending at an oblique angle to the top surface of the channel 24 and having a cross member 27 secured thereto, said cross member being shown as being a channel. The brackets 26 and cross members 27 are further secured to the channels 24 by means of reinforcing angles 28. Mounted on the cross member 27 is a pair of brackets 29 having upwardly extending flanges 30 thereon forming ears through which the shaft or pivot member 31 extends.

Figure 2:
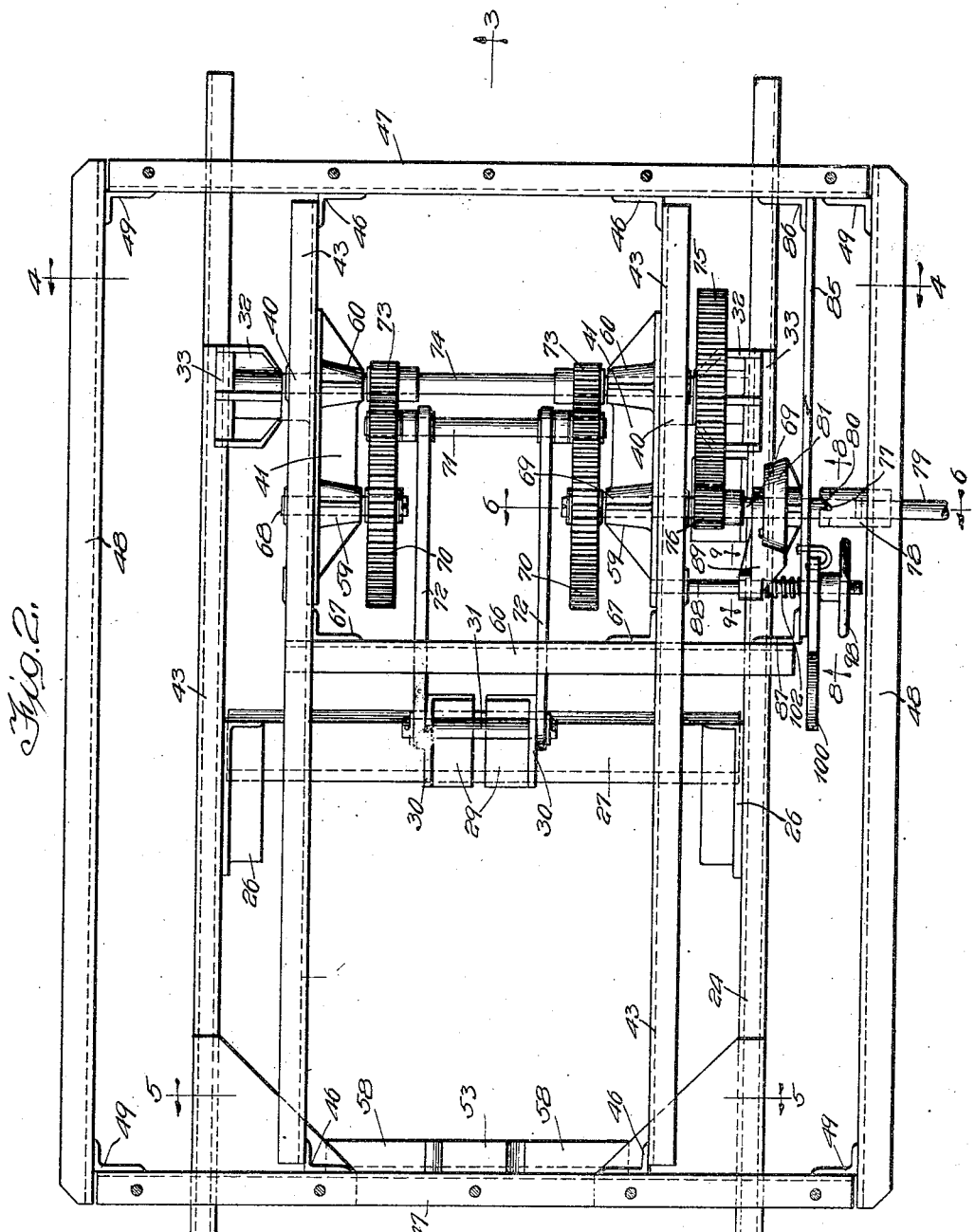
Fig. 2 is an enlarged plan view of the framework upon which the dumping body is mounted and the vehicle framework, showing the mechanism for dumping the body, said view being taken substantially on the line 2—2 of Fig. 1.

The channels 24 are further provided with depending bracket members 32 at the rear ends thereof, said bracket members 32 being mounted on the inner sides of said channels. The bracket members are more clearly shown in Fig. 4 and have hook portions 33 engaging with the top flange of the channel 24 and each is further provided with a substantially flat face 34 engaging with the web of the channel 24 and with a reinforcing web 35 that extends from the hook portion 33 to the laterally extending boss 36. Each of said bosses is provided with an opening 37 for receiving a stub shaft 38 which extends inwardly therefrom and extends through an opening 39 in a boss 40 of a depending bracket member or downwardly extending arm 41 provided on the body carrying frame of the vehicle. There are two of said members 41, one secured to each of the channels 43 running lengthwise under the body 44. The channels 43 are secured by means of the angular brackets 46 to the cross members 47 of the body supporting framework which further includes the longitudinally extending members 48 secured thereto by means of angular securing members 49. Said members 47 and 48 form a rectangular framework for supporting the body 44 as will be clear from Figs. 2 and 4, said members 47 and 48 being shown as being in the form of angles.

Figure 5:
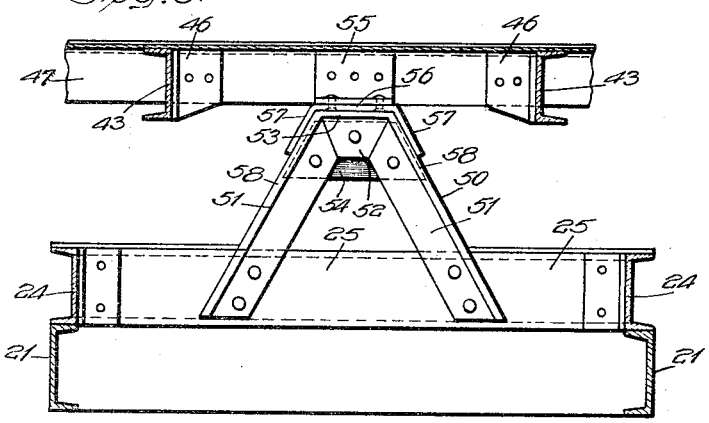
Fig. 5 is a fragmentary sectional view taken substantially on the line 5—5 of Fig. 2.

The cross member 25 has an upwardly extending bracket 50 thereon which is made in the form shown in Fig. 5, said bracket 50 having a pair of leg portions 51 converging toward the top of said member 50 and joining with the transversely extending portion 52, said member 50 being made preferably of material angular in cross section. The member 50, being made of angle iron, has a flange portion at 53 that extends substantially horizontally and which serves as a rest for the forward end of the body. A brace plate 54 is also provided transversely of said member 50 at the apex thereof to strengthen the same.

Figure 3:
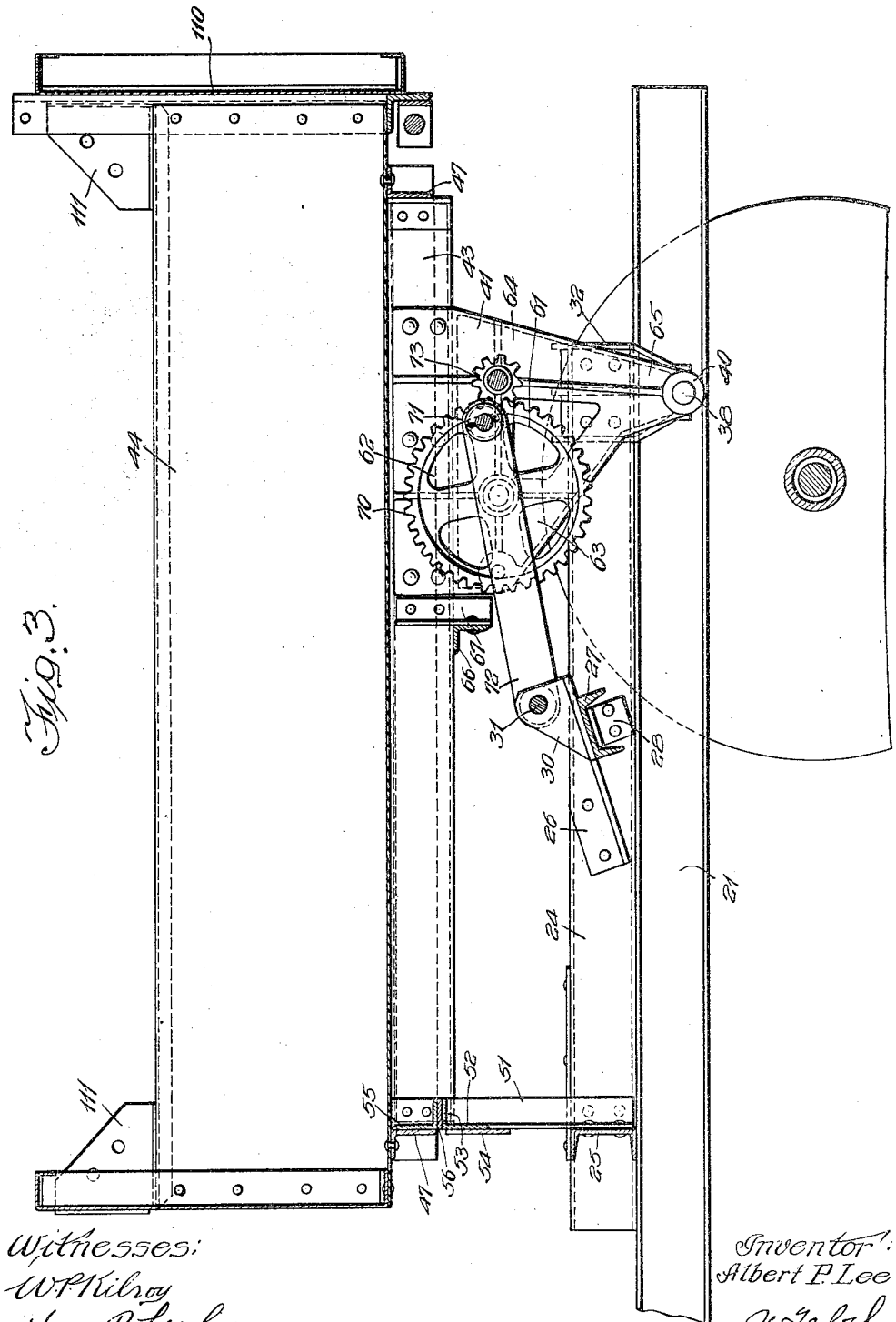
Fig. 3 is an enlarged view, partly in side elevation and partly in longitudinal section of my improved body in load carrying position, said view being taken substantially on the line 3—3 of Fig. 2.
Figure 4:
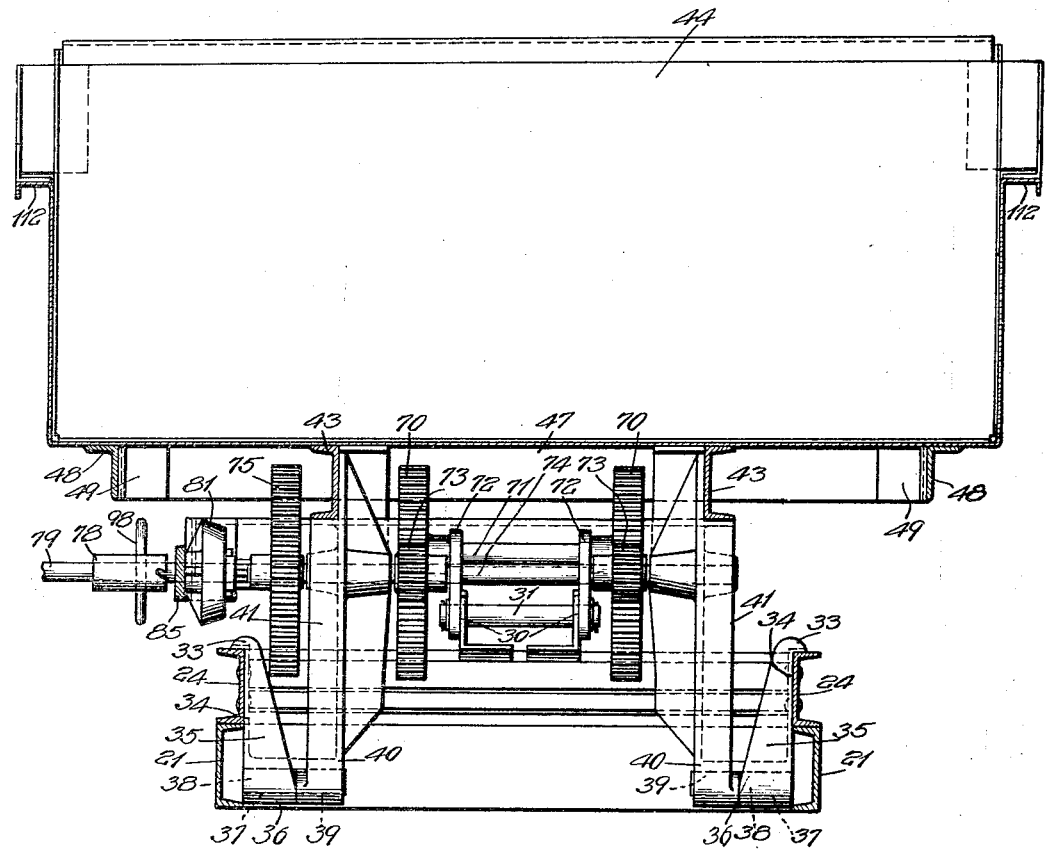
Fig. 4 is a view, partly in transverse section and partly in elevation, of the body shown in Figs. 1 and 3, said view being taken substantially on the line 4—4 of Fig. 2.

The forward transversely extending member 47 on the body supporting frame has a bracket member 55 thereon substantially centrally thereof, said member 55 being angular in cross section, as will be clear from Fig. 3, and having riveted thereto a plate member 56 which is provided with a horizontally extending portion resting on the flange 53 and with diverging leg portions 57 that are bent at substantially the same angle to the horizontally extending portion of said member 56 as the legs 51 are to the transversely extending portion 52. Thus, the portions 57 lie alongside the flanges 58 on the portions 51 of the member 50 receiving said flanges therebetween so as to center the body at the forward end thereof and hold the same against sidewise movement relative to the vehicle framework.

It will thus be seen that the body 44 is supported at the forward end thereof, due to the engagement of the member 56 with the supporting member 50 and due to the engagement of the depending bracket members 41 with the shafts 38 mounted in the brackets 32 provided on the longitudinally extending members 24. It will also be noted that the body may be tilted on the shafts 38 as an axis by raising the forward end thereof away from the support 50, thus moving the body to dumping position. The tilting movement is obtained by suitable mechanism which may be operated either by a hand power device or by any other power operated mechanism which will now be described.

The brackets 41 are preferably in the form of heavy castings which have not only the bosses 40 thereon for receiving the shafts 39 but are also each provided with a pair of bosses 59 and 60. In order to accommodate for the bosses 59 and 60 and to provide a substantial bearing for the bracket 41 on the channel 43, the bracket 41 is made relatively wide at the top thereof and decreases in size toward the bottom at the boss 40 and is preferably made with a central opening 61 for the sake of lightness. Thus, said bracket 41 comprises a transversely extending upper portion 62 and a pair of angularly extending webs or arms 63 and 64 joining at the bottom thereof at 65 adjacent the boss 40. In order to further strengthen the bracket members 41 and hold the same rigidly in position relative to the body supporting framework, a transversely extending angle 66 is provided which is secured to the channel 43 by means of the bracket 67.

The bosses 59 are provided with suitable openings for receiving the stub shaft 68 and the shaft 69. The stub shaft 68 and the shaft 69 are each provided with a gear 70, said gears being freely rotatable on the shafts 68 and 69. The gears 70 are each connected by a transversely extending shaft 71 constituting a crank member upon which are pivotally mounted the ends of arms or links 72, said arms or links 72 having the other ends thereof pivotally mounted on the transversely extending shaft 31 and being free to swing thereon.

The gears 70 mesh with pinions 73 which are mounted on the shaft 74 journaled in the hollow bosses 60. The shaft 74 extends through one of the brackets 41 and has the gear 75 keyed thereon, the pinions 73 being also keyed on the shaft 74. The gear 75 meshes with a pinion 76 keyed on the shaft 69, said shaft 69 being provided with a lug or pin 77 extending laterally therefrom near the outer end thereof and being adapted to receive a sleeve 78 provided on the handle member or hand crank 79 over the same, the sleeve-like portion 78 being further provided with inclined notches or grooves 80 in the end wall thereof so that upon rotation of the handle in a clockwise direction in Figs. 1 and 3, the shaft 69 will be rotated therewith, rotating the pinion 76 driving the gear 75 and the shaft 74 and thus rotating the gear members 70 through the pinions 73. The parts being normally in the full line position shown in Fig. 1 or in the position shown in Fig. 3 when the body is in load carrying position, upon clockwise rotation of the shaft 69 the gear wheel 70 will also rotate in a clockwise direction, thus carrying the crank member 71 downwardly around the gear and causing the portion of the gear 70 carrying the crank member to gradually move toward the forward end of the vehicle relative to the axes of rotation of the members 70, which are the axes of the shaft 68 and the shaft 69. As the shafts 68 and 69 are mounted on the framework supporting the body, which is pivotally mounted on the rockers or brackets 41 swinging about the pivot members or shafts 38, and as the links 72 are of fixed length, this movement will cause the shifting of the shafts 68 and 69 rearwardly relative to the shaft 31, thus raising and tilting the body rearwardly to allow for this movement of the center of rotation of the gears 70 relative to the forward pivots of the links 72 which causes the dumping movement of the body. Inasmuch as the pin and slot connection between the member 78 and the shaft 69 is in the form of a ratchet, it will be evident that when the position of the body becomes such that the weight of the load will be acting rearwardly of the shafts 38 the dumping movement will be completed due to the action of gravity, as the pin 77 will slip out of the slots 80 to permit such movement.

Means is also provided for halting the movement of the body at any point and to hold the body in any position desired. Said means comprises a clutch member or disk 81 which is mounted for rotation with the shaft 69. This is shown more clearly in Figs. 6 and 7. The disk member 81 is provided with a portion 82 that is substantially V-shaped in cross section providing the conical faces 83 and 84.

A longitudinally extending member 85 is provided on the body supporting framework, said member 85 being secured to the cross member 47 by the angle plate 86 and to the member 66 by the angle plate 87. A shaft 88 is journaled in the member 85 and has a shoe 89 pinned thereon by means of the member 90, said shoe having a laterally extending portion 91 provided with an angular groove having the inclined or conical faces 92 and 93 which are adapted to engage with the faces 84 and 83 of the disk member 81. The shoe 89 has a further lateral extension 94 provided with an opening 95 that is adapted to receive the shaft 69. The shaft 88 is provided with a screw-threaded outer end portion 96 with which the internally screwthreaded hub 97 of the hand wheel 98 engages, said hub having an angular flange portion 99 engaging with the lever 100 having an opening 101 through which the shaft 88 passes. A coil compression spring 102 is also provided surrounding the shaft 88 and mounted between the shoe 89 and frame member 85, thus normally holding the shoe 89 away from the frame member 85 and the conical faces 92 and 93 away from the conical faces of the disk member 81. Upon operating of the hand wheel, however, the spring 102 may be compressed so as to throw the shoe 89 toward the member 85 and cause the conical faces of the shoe to engage firmly with the conical faces of the disk member of the clutch to thus hold the shaft 69 from rotation, thus halting the tilting movement of the body. It will be obvious that with the hand wheel construction for compressing the spring 102 a very tight engagement can be obtained between the shoe and the disk of the clutch and the body can be held firmly in any desired position no matter what the angle thereof may be.

It may, however, be desirable to slow down or stop the movement of the body more quickly than can be done with the hand wheel. For this reason the lever 100 is provided. Said lever has a notch 103 in the end thereof engaging with a U-bolt 104 having an unthreaded end 105 mounted in a recess 106 in the member 85 and having a threaded end 107 passing through an opening in the member 85 and held in position by means of a nut or other securing means 108. Thus, the lever 100 is held from turning movement or swinging movement and an outward pull on the outer end thereof will cause the notched end of the lever to fulcrum on the member 85 and cause the shaft 88 to be slid outwardly, compressing the spring 102 and causing the shoe 89 to engage with the disk 81 at the conical faces thereof to act as a brake to either slow down or halt the movement of the body as it is dumping. The lever 100 can, of course, also be used for holding the body in any position desired but it would be necessary to constantly exert pressure thereon to do this which would make the use of the hand wheel much more desirable for this purpose, if the body is to be held stationary for any length of time.

The body 44 is provided with an end gate 110 which is pivoted as shown in Fig. 1 so that the same may swing open upon dumping movement, as shown in dotted lines in Fig. 1. The body is further provided with corner brackets 111 and laterally extending supports 112 for suitably supporting side boards or other suitable devices for increasing the capacity of the body when desired.

From the above it will be seen that a dumping body is provided that is mounted to swing on pivots on the vehicle framework, said body being movable toward dumping position by means of manually operated actuating means, comprising a pair of links pivoted to said framework and pivoted to a rotatable member rotating about a shaft on a framework movable with said body, said rotatable member being rotatable about its axis by actuation of a handle.

While the operation of the device in dumping has been described, the operation of the gear driven rotatable member to return the body to normal position has not been described above. When the body has moved completely to dumping position the position of the shaft or crank arm 71 relative to the shaft members 68 and 69 will be such that the same will be substantially diametrically opposite the full line position shown therefor in Fig. 3. Accordingly, upon further clockwise rotation of the members 70, the shaft member 71 will travel upwardly and rearwardly relative to the shafts 68 and 69 around the upper half of its circular path of movement, thus moving the center of rotation of the members 70 closer to the shaft 31, whereby the body 44 is returned gradually to load carrying position. Thus, it will be seen that the members 70 always are rotated in the same direction by means of the crank, both for raising the body and lowering the same, and that the connection between the crank and the mechanism is such that as soon as the body has reached a position where the action of gravity will aid in dumping the load, gravity will act without interference of the crank mechanism to move the body to its full dumping position.

I claim:

1. A dumping vehicle of the character described comprising a framework, a body swingable on a horizontal axis on said framework and means for swinging said body on its axis in either direction, comprising members mounted to pivot on a fixed axis on said framework and on a shiftable axis relative to said body and rotatable means on said body for shifting said last mentioned axis, said rotatable means being rotatable in the same direction, to move said body in either direction.

2. A dumping vehicle of the character described comprising a framework, a dumping body on said framework and means for dumping said body comprising a rotatable member mounted on an axis fixed relative to said body, a member pivotally mounted on an axis fixed relative to said framework connected with said first member, means for actuating said members to vary the distance between said axes and means for holding said rotatable member against rotation to hold said body in any desired position, comprising braking mechanism geared to said rotatable member, and rotatable means on said body for actuating said braking mechanism.

3. A dumping vehicle of the character described comprising a framework, a dumping body on said framework and means for dumping said body comprising a rotatable member mounted on an axis fixed relative to said body, a member pivotally mounted on an axis fixed relative to said framework connected with said first member, means for actuating said members to vary the distance between said axes and means for holding said rotatable member against rotation to hold said body in any desired position, comprising braking mechanism on said body geared to said rotatable member and a lever on said body for actuating said braking mechanism.

4. In a dumping vehicle, a vehicle framework, a dumping body, a framework supporting said body pivotally mounted on said vehicle framework and means for swinging said pivoted framework on its pivots comprising means rotatably mounted on said pivoted framework, a crank member thereon and a link connecting said crank member with said vehicle framework.

5. In a dumping vehicle, a vehicle framework, a dumping body, a framework supporting said body pivotally mounted on said vehicle framework and means for swinging said pivoted framework on its pivots comprising means rotatably mounted on said pivoted framework, a crank member thereon and a link connecting said crank member with said vehicle framework, said means being rotatable in the same direction both to dump said body and return the same to load carrying position.

6. In a dumping vehicle, a vehicle framework, a dumping body, a framework supporting said body pivotally mounted on said vehicle framework and means for swinging said pivoted framework on its pivots comprising means rotatably mounted on said pivoted framework, a crank member thereon, a link connecting said crank member with said vehicle framework and actuating means for rotating said rotatable means comprising a train of gears.

7. In a dumping vehicle, a vehicle framework, a dumping body, a framework supporting said body pivotally mounted on said vehicle framework and means for swinging said pivoted framework on its pivots comprising means rotatably mounted on said pivoted framework, a crank member thereon, a link connecting said crank member with said vehicle framework and actuating means for rotating said rotatable means comprising a train of gears and a member for driving said gears connected therewith so as to permit rotation of said gears independently thereof.

8. In a dumping vehicle, a vehicle framework, a dumping body, a framework supporting said body pivotally mounted on said vehicle framework and means for swinging said pivotal framework on its pivots comprising means rotatably mounted on said pivoted framework, a crank member thereon, a link connecting said crank member with said vehicle framework and actuating means for rotating said rotatable means comprising a train of gears and a member for driving said gears connected therewith so as to permit rotation of said gears independently thereof due to the action of gravity when said body is moving to dumping position.

9. In a dumping vehicle, a vehicle framework, a dumping body, a framework supporting said body pivotally mounted on said vehicle framework and means for swinging said pivoted framework on its pivots comprising means rotatably mounted on said pivoted framework, a crank member thereon, a link connecting said crank member with said vehicle framework and actuating means for rotating said rotatable means comprising a train of gears and a member for driving said gears connected therewith so as to permit rotation of said gears independently thereof due to the action of gravity when said body is moving to dumping position, but preventing rotation thereof independently of said member due to the action of gravity when said body is moving to load carrying position.

10. In a dumping vehicle, a vehicle framework, a dumping body, a framework supporting said body pivotally mounted on said vehicle framework and means for swinging said pivoted framework on its pivots comprising means rotatably mounted on said pivoted framework, a crank member thereon, a link connecting said crank member with said vehicle framework, actuating means for rotating said rotatable means comprising a train of gears, and brake mechanism positively connected with said gears.

11. In a dumping vehicle, a vehicle framework, a dumping body, a framework supporting said body pivotally mounted on said vehicle framework and means for swinging said pivoted framework on its pivots comprising means rotatably mounted on said pivoted framework, a crank member thereon, a link connecting said crank member with said vehicle framework, actuating means for rotating said rotatable means comprising a train of gears, and brake mechanism positively connected with said gears, said brake mechanism comprising a disk member having a bevelled face and a shoe correspondingly bevelled.

12. A dumping vehicle comprising a vehicle framework, a framework pivotally supported thereon, a dumping body on said last mentioned framework and means for dumping said body comprising a train of gears mounted on said pivotally supported framework, comprising gears having crank mechanism thereon, and rigid links connecting said crank mechanism with said vehicle framework.

In witness whereof, I hereunto subscribe my name this 28th day of April, A. D. 1924.

ALBERT P. LEE.